(12) United States Patent
Cheng et al.

(10) Patent No.: US 11,322,748 B2
(45) Date of Patent: May 3, 2022

(54) HIGH-ENERGY CATHODE MATERIAL PARTICLES WITH OXY-FLUORIDE SURFACES FOR AQUEOUS PROCESSING

(71) Applicants: Seeo, Inc., Hayward, CA (US); Robert Bosch GmbH, Stuttgart (DE)

(72) Inventors: Lei Cheng, Santa Clara, CA (US); Saravanan Kuppan, Sunnyvale, CA (US); Sondra Hellstrom, Sunnyvale, CA (US); Michael Metzger, Sunnyvale, CA (US); Yiqing Huang, San Leandro, CA (US); Tristan Palmer, San Francisco, CA (US); Hany Basam Eitouni, Oakland, CA (US)

(73) Assignee: Robert Bosch GmbH, Stuttgart (DE)

( * ) Notice: Subject to any disclaimer, the term of this patent is extended or adjusted under 35 U.S.C. 154(b) by 556 days.

(21) Appl. No.: 16/218,475

(22) Filed: Dec. 12, 2018

(65) Prior Publication Data
US 2020/0106105 A1    Apr. 2, 2020

Related U.S. Application Data

(63) Continuation of application No. PCT/US2018/053669, filed on Sep. 30, 2018.

(51) Int. Cl.
*H01M 4/66*    (2006.01)
*H01M 10/0525*    (2010.01)
(Continued)

(52) U.S. Cl.
CPC ......... *H01M 4/668* (2013.01); *H01M 4/1391* (2013.01); *H01M 4/622* (2013.01); *H01M 10/0525* (2013.01); *H01M 2004/028* (2013.01)

(58) Field of Classification Search
CPC .................................................... H01M 4/366
See application file for complete search history.

(56) References Cited

U.S. PATENT DOCUMENTS

| 8,916,294 B2 | 12/2014 | Kumar et al. |
| 9,843,041 B2 | 12/2017 | Lopez et al. |
| (Continued) | | |

FOREIGN PATENT DOCUMENTS

| JP | 2013062080 A | 4/2013 |
| WO | 2006109930 A1 | 10/2006 |
| WO | 2011054440 A1 | 5/2011 |

OTHER PUBLICATIONS

Google translation of JP2013062080.
(Continued)

*Primary Examiner* — Stephan J Essex
(74) *Attorney, Agent, or Firm* — Brooks Kushman P.C.

(57) ABSTRACT

A method of forming a metal oxy-fluoride surface on lithium metal oxide cathode material particles is disclosed. Such a metal oxy-fluoride surface may help to prevent lithium metal oxide cathode active materials from reacting with water, thus enabling aqueous processing of cathodes made from such materials in the manufacture of lithium batteries. Such a method may also reduce lithium battery manufacturing costs and time by substituting water for currently-used organic solvents that are expensive and require special handling and disposal. Such a method may also reduce the cost of lithium metal oxide cathode active materials as the requirements for moisture-free manufacture, storage, and processing will be reduced or eliminated.

18 Claims, 6 Drawing Sheets

(51) Int. Cl.
    *H01M 4/1391*  (2010.01)
    *H01M 4/62*    (2006.01)
    *H01M 4/02*    (2006.01)

(56) References Cited

U.S. PATENT DOCUMENTS

| | | |
|---|---|---|
| 2010/0024597 A1 | 2/2010 | Dover et al. |
| 2013/0330615 A1 | 12/2013 | Morita et al. |
| 2014/0272591 A1 | 9/2014 | Vanier et al. |
| 2015/0372293 A1 | 12/2015 | Story et al. |
| 2016/0028114 A1* | 1/2016 | Pratt ............... H01M 4/62 |
| | | 429/309 |
| 2016/0218356 A1 | 7/2016 | Paulsen et al. |
| 2017/0187035 A1* | 6/2017 | Yanagihara ........... H01M 4/525 |
| 2017/0207444 A1* | 7/2017 | Yanagihara ........... B60L 53/16 |
| 2017/0331155 A1 | 11/2017 | Yang et al. |
| 2017/0338471 A1 | 11/2017 | Zheng et al. |

OTHER PUBLICATIONS

International Search Report for PCT/US2018/053669 dated Nov. 30, 2018.
Kim et al., "Washing Effect of a LiNi0.83Co0.15Al0.02O2 Cathode in Water," Electrochem. Solid-State Lett. 9(1) A19-A23, 2006.
Moshtev et al., "Synthesis, XRD characterization and electrochemical performance of overlithiated LiNiO2," J.Power Sources, 81-82, 434 (1999).
Shkrob et al., "Chemical Weathering of Layered Ni-Rich Oxide Electrode Materials: Evidence for Cation Exchange," Journal of The Electrochemical Society, 164 (7) A1489-A1498 (2017).

* cited by examiner

HIGH-ENERGY CATHODE MATERIAL PARTICLES WITH OXY-FLUORIDE SURFACES FOR AQUEOUS PROCESSING

CROSS-REFERENCE TO RELATED APPLICATIONS

This application is a continuation of International Application No. PCT/US2018/053669, filed Sep. 30, 2018, which is incorporated by reference herein.

BACKGROUND OF THE INVENTION

Field of the Invention

This invention relates generally to manufacture of lithium battery cells, and, more specifically, to improved materials and methods for manufacturing and storing lithium-based cathodes.

High-voltage, high-capacity lithium metal oxide cathode active materials are especially desirable in lithium-based battery cell technologies as they offer increased energy density as compared to conventional cathode materials. In general, lithium metal oxide cathode active material particles have water-reactive surfaces, which makes processing them with water problematic. When such particles are mixed with water, they raise the water pH, which can lead to corrosion of metal current collectors in battery cells made from such water-processed particles. Therefore, lithium metal oxide cathode active material particles are processed using organic solvents (e.g., N-methyl-2-pyrrolidon), many of which are toxic and require special methods for handling and disposal. In addition, lithium metal oxide cathode active materials manufacturers set prices for these materials, which reflect additional processing to ensure that the materials are fully anhydrous. If small amounts of water in purchased lithium metal oxide cathode active materials could be tolerated, it is likely that the costs of these materials could be reduced.

It would be useful to find a way to process high-voltage, high-capacity cathode active materials with water instead of organic solvents in order to simplify manufacturing, reduce costs and reduce the environmental burden caused by organic solvents.

BRIEF DESCRIPTION OF THE DRAWINGS

The foregoing aspects and others will be readily appreciated by the skilled artisan from the following description of illustrative embodiments when read in conjunction with the accompanying drawings.

SUMMARY

Figure 1:
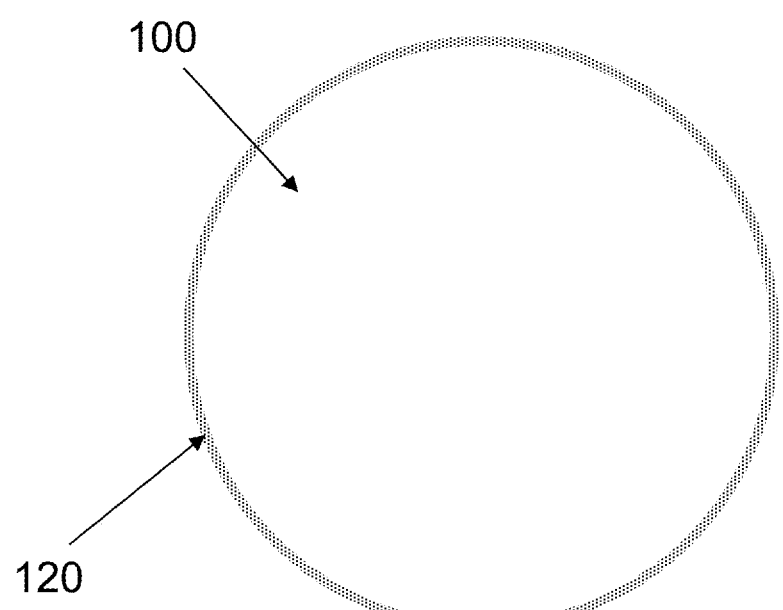
FIG. 1 is a schematic illustration of an NMC particle with an oxy-fluoride surface, according to an embodiment of the invention.

In some embodiments of the invention, modified cathode active materials are provided. The modified cathode active materials are particles of lithium metal oxide cathode active material, which contain at least one metal M. The surfaces of the particles are made of M-oxy-fluoride and/or M-fluoride. M may be any of aluminum, antimony, cadmium, chromium, cobalt, copper, iridium, iron, lithium, magnesium, manganese, molybdenum, nickel, niobium, silver, tantalum, titanium, tungsten, vanadium, yttrium, zinc, zirconium, or combinations thereof. In some arrangements, the particles have an average diameter between 0.1 and 50 μm.

In some embodiments of the invention, a method of treating cathode active material particles is provided. The method involves combining lithium metal oxide cathode active material particles with a fluorination agent and then stirring and heating to between 0° C. and 200° C. for between 1 and 150 hours to form modified lithium metal oxide cathode active material particles. The modified lithium metal oxide cathode active material particles may then be removed from any residual fluorination agent.

The fluorination agent may be $LiBF_4$, dissolved in cyclohexanone or acetonitrile. The fluorination agent may be $NH_4F$, dissolved in a mixture of water and ethanol. The fluorination agent may be one or more of HF, $LiPF_6$, $HBF_4$, and $NaBF_4$, dissolved in water. The fluorination agent may be a gas such as HF or $PF_5$. The fluorination agent may also include an additive such as aluminum trifluoroacetate, tris (2,2,2-trifluoroethyl) borate and/or tris(2,2,2-trifluoroethyl) phosphite.

In some embodiments of the invention, a method of treating a cathode active material particle involves mixing lithium metal oxide cathode active material particles with LiF powder and then heating the mixture to between 0° C. and 800° C. for between 1 and 72 hours to form modified lithium metal oxide cathode active material particles.

In other embodiments of the invention, a cathode includes the modified cathode active material particles as described herein, a cathode electrolyte, and an electrolyte salt, which are all mixed together. The cathode electrolyte may be any of alkyl carbonates, polyethers, polyamines, polyimides, polyamides, poly alkyl carbonates, polynitriles, perfluoro polyethers, fluorocarbon polymers substituted with high dielectric constant groups such as nitriles, carbonates, sulfones, or combinations thereof. The electrolyte salt may be a lithium salt.

In other embodiments of the invention, an electrochemical cell includes the cathode described above, an anode configured to absorb and release lithium ions, a current collector adjacent to an outside surface of the cathode, and a separator region between the anode and the cathode. There is a separator electrolyte in the separator region. The separator electrolyte contains an electrolyte salt and is configured to facilitate movement of lithium ions back and forth between the anode and the cathode.

The anode comprises may be any of lithium metal, lithium alloy, lithium titanate, graphite and silicon. The separator electrolyte may be any of alkyl carbonates, polyethers, polyamines, polyimides, polyamides, poly alkyl carbonates, polynitriles, perfluoro polyethers, fluorocarbon polymers substituted with high dielectric constant groups such as nitriles, carbonates, sulfones, or combinations thereof. In some arrangements, the separator electrolyte contains a solid polymer electrolyte. In some arrangements, the catholyte and the separator electrolyte are the same.

DETAILED DESCRIPTION

The preferred embodiments are illustrated in the context of manufacturing of lithium and lithium ion battery cells. The skilled artisan will readily appreciate, however, that the materials and methods disclosed herein will have application in a number of other contexts where water processing of metal oxide cathode active particles is desirable.

These and other objects and advantages of the present invention will become more fully apparent from the following description taken in conjunction with the accompanying drawings.

As is well known in the lithium battery cell arts, lithium metal oxide cathode active materials include layered structures, spinel structures, and over-lithiated structures. There are various ways to describe lithium metal oxide cathode active materials.

In some arrangements, lithium metal oxide cathode active materials can be described by the formula, $Li_{(2+2x)/(2+x)}M'_{2x/(2+x)}M_{(2-2x)/(2+x)}O_{(2-\delta)}$, in which $0<x<1$ and $\delta$ is greater than zero and less than 0.2, and in which M is a non-lithium metal ion with an average trivalent oxidation state selected from two or more of the first row transition metals or lighter metal elements in the periodic table, and M' is one or more ions with an average tetravalent oxidation state selected from the first and second row transition metal elements and Sn.

In some arrangements, lithium metal oxide cathode active materials can be described by the general formula: $Li_x Mn_{2-y}M_yO_2$, where M is chosen from Mn, Ni, Co, and/or Cr; x is described by $0.05 \leq x \leq 1.1$; and y is described by $0 \leq y \leq 2$. In some arrangements, the positive electrode active material is described by the general formula: $Li_x M_y Mn_{4-y}O_8$, where M is chosen from Ni, Fe and/or Co; x is described by $0.05 \leq x \leq 2$; and y is described by $0 \leq y \leq 4$. In some arrangements, the positive electrode active material is described by the general formula: $Li_x M_y Mn_{4-y}O_4$, where M is chosen from Ni, Fe and/or Co; x is described by $0.05 \leq x \leq 2$; and y is described by $0 \leq y \leq 4$. In some arrangements, the positive electrode active material is given by the general formula: $Li(Ni_{0.5-x}Co_{0.5-x}M_{2x})O_2$, where M is chosen from Al, Mg, Mn, and/or Ti; and x is described by $0 \leq x \leq 0.2$. In some arrangements, the positive electrode active material is given by the formula: $Li(NiMnCo)O_2$. In some arrangements, the positive electrode active material is given by the formula: $Li(Ni_{1/3}Mn_{1/3}Co_{1/3})O_2$. In some arrangements, lithium metal oxide cathode active materials include $LiNiVO_2$. Combinations of lithium metal oxide cathode active materials can also be used. In some arrangements, lithium metal oxide cathode active materials are doped with other metals such as aluminum, antimony, cadmium, chromium, cobalt, copper, iridium, iron, magnesium, manganese, molybdenum, nickel, niobium, silver, tantalum, titanium, tungsten, vanadium, yttrium, zinc, zirconium, and combinations thereof, all of which may form hydroxide or oxide surfaces.

Examples of commonly-used lithium metal oxide cathode active material include, but are not limited to, lithium nickel cobalt aluminum oxide (NCA), lithium nickel cobalt manganese oxide (NCM), lithium manganese oxide (LMO), and lithium cobalt oxide (LCO).

Metal atoms on the surface of particles made of lithium metal oxide cathode active material are bonded to —OH groups, which make the surface basic. Slurries made with such lithium metal oxide cathode active material particles are so basic that cathode active material layers made with them tend to corrode adjacent current collectors. Furthermore, commonly-used polymer binders, such as PVdF, can agglomerate in high pH environments causing gelation of the slurry, which makes processing difficult. In order to avoid this problem, such slurries are made using organic solvents instead of water.

As disclosed herein, methods have been found to reduce the water reactivity of the outside surface of lithium metal oxide cathode active material particles in order to make lower pH water-based slurries that do not cause current collector corrosion or binder agglomeration. In some embodiments of the invention, the surfaces of lithium metal oxide cathode active material particles are modified by adding fluorine to form metal-fluorine bonds. A fluorinated surface on a lithium metal oxide cathode active material particle stabilizes the particle chemically to prevent it from reacting with water. Without being limited to any specific theory, the fluorination agent may react with pre-existing —OH groups or it may prevent new —OH groups from forming when the active material is exposed to water, whether or not the —OH groups are lithium hydroxides or some other metal hydroxides. Thus, the surface is less basic, enabling water as a processing solvent, and it is no longer desirable to use organic solvents to form cathodes in lithium battery cell manufacturing.

FIG. 1 is a schematic illustration of a lithium metal oxide cathode active material particle 100 that has undergone surface modification and has a modified surface 120 that contains M-O-F (metal-oxy-fluoride) or M-F (metal-fluoride) groups, according to an embodiment of the invention. Typically, an average lithium metal oxide cathode active material particle ranges in size from about 0.1 to 50 μm. The modified surface 120 is atomically thin—the surface contains —OF or —F groups bonded to metal atoms in the lithium metal oxide cathode active material particle 110.

In some embodiments of the invention, the surfaces of lithium metal oxide cathode active material particles are modified using a wet process. A fluorination agent is dissolved in a solvent to form a solution with a concentration between 0.001 and 1 M. In some arrangements, fluorine additives such as aluminum trifluoroacetate, tris(2,2,2-trifluoroethyl) borate, tris(2,2,2-trifluoroethyl) phosphite, or combinations thereof are also added to the solution. Lithium metal oxide cathode active material particles are added to this solution and stirred continuously at a temperature between 0° C. and 200° C. for 1 to 150 hours or between 0° C. and 100° C. for 1 to 72 hours. Then the lithium metal oxide cathode active material particles are collected, rinsed and dried to remove any residual fluorination agent. Table I below shows examples of liquid and solid fluorination agents and solvents that can be used to make the solution. A person with ordinary skill in the art will understand that other combinations of fluorination agents and solvents are possible in the embodiments of the invention.

TABLE I

Exemplary Fluorination Agent - Solvent Combinations

| Fluorination Agent | Solvent |
| --- | --- |
| $LiBF_4$ (lithium tetrafluoroborate) | cyclohexanone |
| $LiBF_4$ | acetonitrile |
| $NH_4F$ (ammonium fluoride) | water and ethanol |
| HF (hydrofluoric acid) | water |

TABLE I-continued

Exemplary Fluorination Agent - Solvent Combinations

| Fluorination Agent | Solvent |
|---|---|
| $LiPF_6$ (lithium hexafluorophosphate) | water |
| $HBF_4$ (fluoroboric acid) | water |
| $NaBF_4$ (sodium tetrafluoroborate) | water |

In some embodiments of the invention, surfaces of lithium metal oxide cathode active material particles are modified using a dry process in which fluorination agent(s) are mixed with lithium metal oxide cathode active material particles (without solvent) and heated. Any of the fluorination agents disclosed above may be used in a dry process. In addition, lithium fluoride (LiF) powder may also be used to modify the surfaces of lithium metal oxide cathode active material particles using a dry process.

Solid fluorination agent powders are mixed with lithium metal oxide cathode active material particles. The mixture is heated at a temperature between 0° C. and 800° C. for 1 to 72 hours. The lithium metal oxide cathode active material particles may be rinsed to remove any residual fluorination agent powder. Alternatively, any residual fluorination agent powder may be blown off from the lithium metal oxide cathode active material particles.

In some embodiments of the invention, the surfaces of lithium metal oxide cathode active material particles are modified using a gaseous process in which gaseous fluorination agent(s), such as HF (hydrogen fluoride) gas or $PF_5$ (phosphorus pentafluoride) gas are mixed with lithium metal oxide cathode active material particles and heated. Other fluorine-containing gases may be used in this process, such as tetrafluoroethylene or other fluorinated organic gases.

The pH values for pristine and modified $LiNi_{0.6}Mn_{0.2}Co_{0.2}O_2$ (NMC622) particles in water were measured, and the results are shown in Table II below. The Sample 1 particles were pristine and did not undergo any surface modification process. The surface of $LiNi_{0.6}Mn_{0.2}Co_{0.2}O_2$ (NMC622) particles were modified using processes as described herein. For Sample 2, $LiBF_4$ was dissolved in cyclohexanone to form 0.1 mol/L concentration solution. The NMC particles were added to the solution and stirred continuously at 300 RPM and held at 60° C. for 72 hours. Then the NMC particles were collected, rinsed and dried to remove residual $LiBF_4$. For Sample 3, $LiBF_4$ was dissolved in acetonitrile to form 0.1 mol/L concentration solution. The NMC particles were added to the solution and stirred continuously at 300 RPM and held at 60° C. for 72 hours. Then the NMC particles were collected, rinsed and dried to remove residual $LiBF_4$. Each sample of particles was added separately to water for 1 hour to form an aqueous slurry, and then the pH of the slurry was measured.

TABLE II pH of NMC material

| Sample Number | Modification Process | pH of Slurry |
|---|---|---|
| 1 | None | 10-11 |
| 2 | #1 (CHN + $LiBF_4$) | 7-8 |
| 3 | #2 (ACN + $LiBF_4$) | 7-8 |

The Sample 2 slurry and the Sample 3 slurry both had significantly lower pH that the Sample 1 slurry that had not undergone any surface modification processing.

Figure 2:
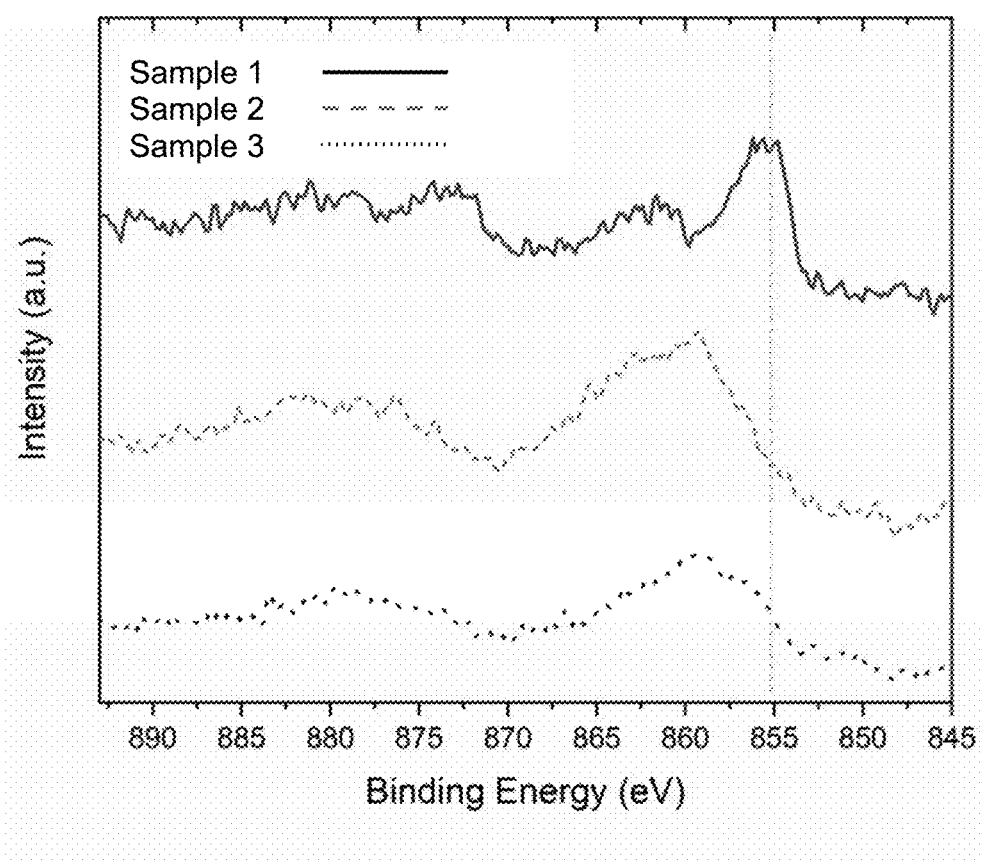
FIG. 2 is a graph showing a nickel x-ray photoelectron spectrum for various lithium metal oxide cathode active material particles.

FIG. 2 is a graph that shows nickel 2p x-ray photoelectron spectra (XPS) taken from NMC Sample 1 (no modification) and from NMC Samples 2 and 3 particles that had undergone surface modification as described above. The solid curve is from Sample 1, the dashed curve is from Sample 2, and the dotted curve is from Sample 3. In Sample 1, the peak at a binding energy of 855 eV is from nickel. The Ni peak moves to higher binding energies in the modified NMC particles of Samples 2 and 3. The Ni peak is also broader for Samples 2 and 3 than for Sample 1, suggesting that on the surface of the NMC particle, the Ni atoms have formed bonds with species that are more electronegative than oxygen which is on the surface of unmodified Sample 1. The results suggest that the surface modification process has caused nickel to bond with fluorine.

Figure 3:
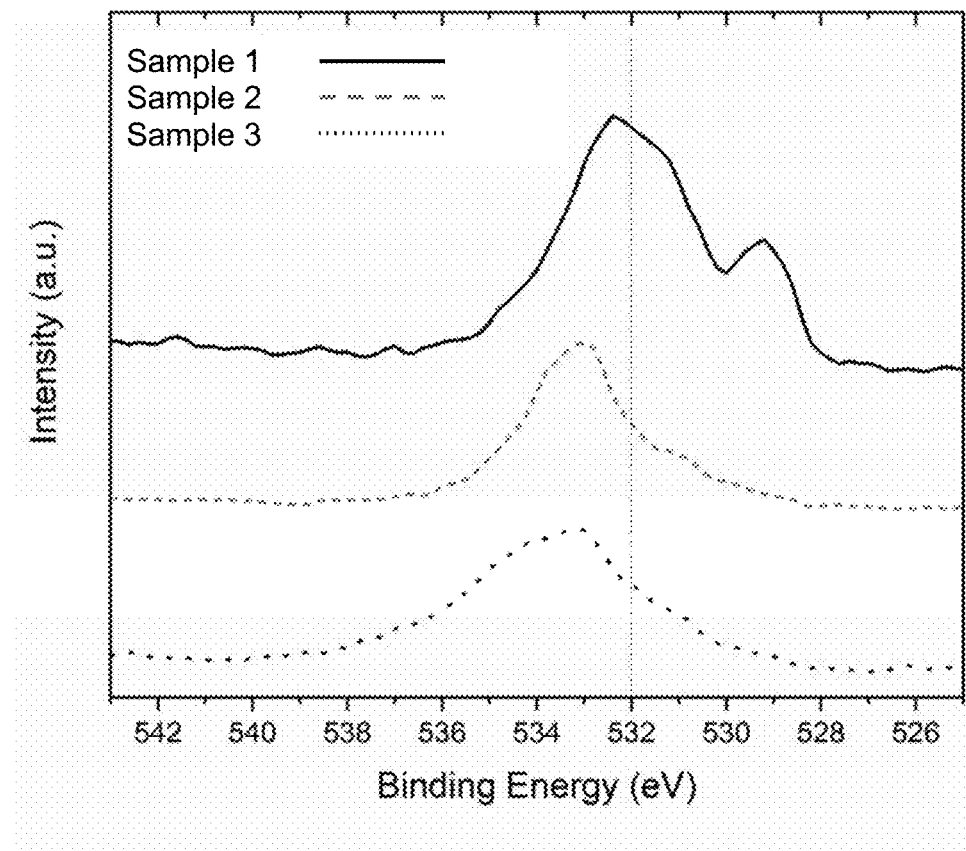
FIG. 3 is a graph showing an oxygen x-ray photoelectron spectrum for various lithium metal oxide cathode active material particles.

FIG. 3 is a graph that shows oxygen is XPS spectra taken from NMC Sample 1 (no modification) and from NMC Samples 2 and 3 particles that had undergone surface modification as described above. The solid curve is from Sample 1, the dashed curve is from Sample 2, and the dotted curve is from Sample 3. In Sample 1, the peak at a binding energy of 532 eV is from oxygen. The oxygen peak moves to higher binding energies in the modified NMC particles of Samples 2 and 3, suggesting weaker chemical bonds between oxygen atoms and metal atoms in the NMC, which may be a result of the metal atoms forming bonds with the more electronegative fluorine atoms. These spectra are consistent with the spectra shown in FIG. 2, further supporting the conclusion that the surface modification process has caused nickel to bond with fluorine.

Figure 4:
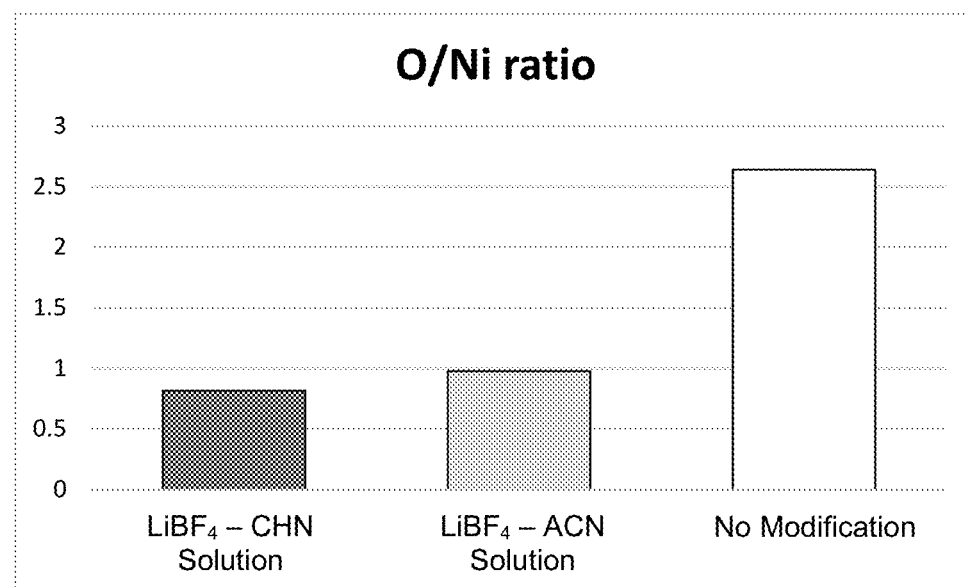
FIG. 4 is a graph that shows the relative intensity of oxygen to nickel on the surface of various lithium metal oxide cathode active material particles as determined by x-ray photoelectron spectroscopy.

FIG. 4 is a bar graph that shows the ratio of oxygen to nickel on the surface of various NMC particles. The dark grey bar shows the surface O/Ni ratio of NMC particles whose surfaces have been modified using a solution of $LiBF_4$ and CHN (cyclohexanone). The ratio is about 0.8. The light grey bar shows the surface O/Ni ratio of NMC particles whose surfaces have been modified using a solution of $LiBF_4$ and ACN (acetonitrile). The ratio is nearly 1.0. The white bar shows the surface O/Ni ratio of pristine NMC particles whose surfaces have not been modified. The ratio is about 2.7. Both NMC particles that had undergone a surface modification process had significantly lower O/Ni ratios than the pristine NMC particles.

Figure 5:
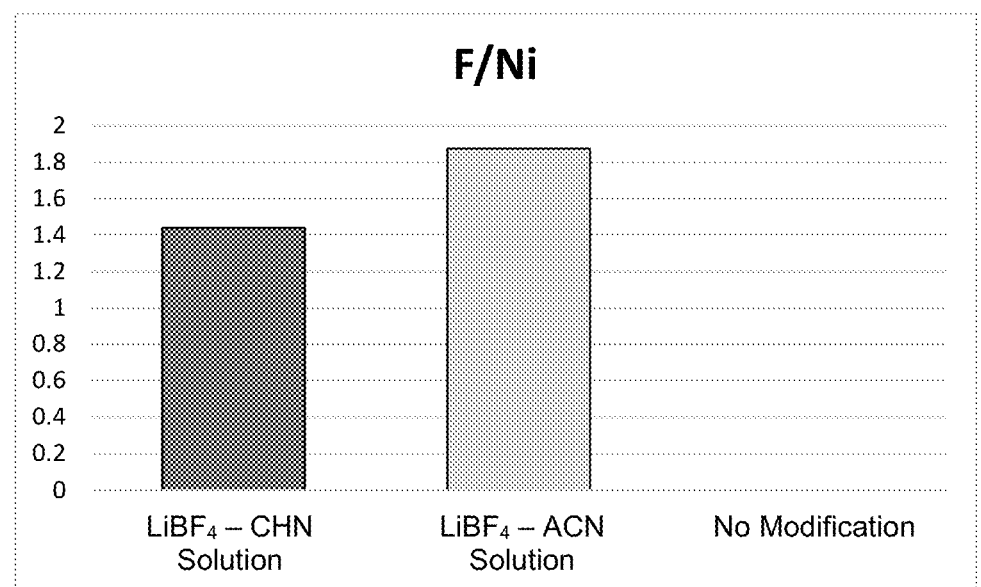
FIG. 5 is a graph that shows the relative intensity of fluorine to nickel on the surface of various lithium metal oxide cathode active material particles as determined by x-ray photoelectron spectroscopy.

FIG. 5 is a bar graph that shows the ratio of fluorine to nickel on the surface of various NMC particles. The dark grey bar shows the surface F/Ni ratio of NMC particles whose surfaces have been modified using a solution of $LiBF_4$ and CHN (cyclohexanone). The ratio is nearly 1.5. The light grey bar shows the surface F/Ni ratio of NMC particles whose surfaces have been modified using a solution of $LiBF_4$ and ACN (acetonitrile). The ratio is about 1.9. The pristine NMC particles contained no fluorine, so the F/Ni ratio is 0.

The data shown in FIGS. 4 and 5 further support that the surface modification of NMC particles changed the original Ni—O bonding to Ni—O—F and/or Ni—F bonding on NMC surfaces.

In some embodiments of the invention, the lithium metal oxide cathode active material particles contain $Li(Ni_{1/3}Mn_{1/3}Co_{1/3})O_2$, and the composition of the surface after modification is $Li(Ni_{1/3}Mn_{1/3}Co_{1/3})O_{(2-x)}F_x$, wherein x is between 0 and 1.

Cell Designs that Include Lithium Metal Oxide Cathode Active Materials

Figure 6:
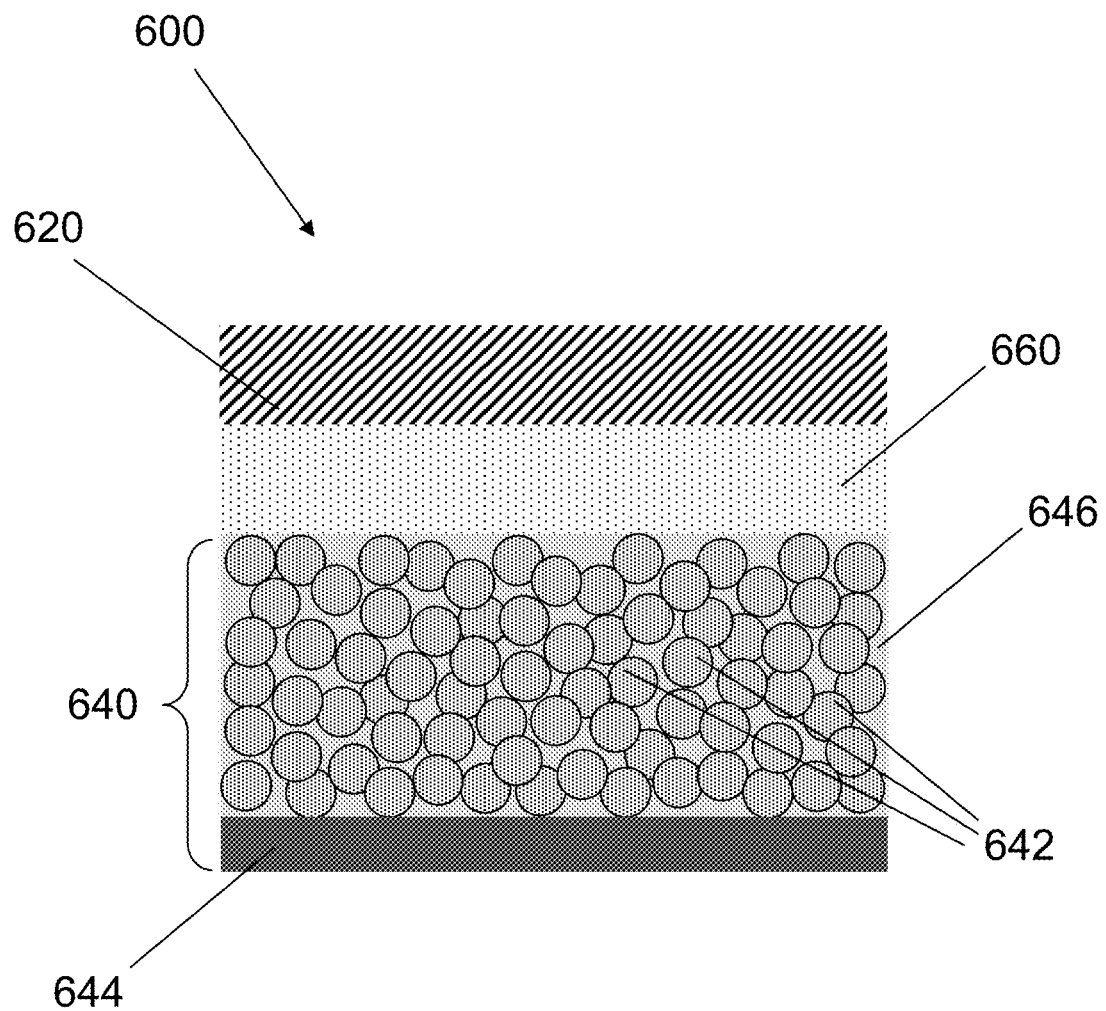
FIG. 6 is a schematic illustration of a lithium battery cell that contains surface-modified lithium metal oxide cathode active material particles, according to an embodiment of the invention.

In another embodiment of the invention, a lithium battery cell 600 has an anode 620 that is configured to absorb and release lithium ions as shown in FIG. 6. The anode 620 may be a lithium or lithium alloy foil or it may be made of a material into which lithium ions can be absorbed such as graphite or silicon. Other choices for the anode 620 include, but are not limited to, lithium titanate, and lithium-silicon alloys. The lithium battery cell 600 also has a cathode 640 that includes particles 642 of any lithium metal oxide cathode active material whose surfaces have been modified, as disclosed herein, an electronically-conductive additive such as carbon black (not shown), a current collector 644, a catholyte 646, and an optional binder (not shown). In some arrangements, the catholyte 646 includes any of the electrolytes disclosed below. Suitable electronically-conductive additives include, but are not limited to, carbon black, graphite, vapor-grown carbon fiber, graphene, carbon nanotubes, and combinations thereof. A binder can be used to hold together the particles 642 of the lithium metal oxide cathode active material whose surfaces have been modified and the electronically conductive additive. Suitable binders include, but are not limited to, PVDF (polyvinylidene difluoride), PVDF-HFP poly (vinylidene fluoride-co-hexafluoropropylene), PAN (polyacrylonitrile), PAA (polyacrylic acid), PEO (polyethylene oxide), CMC (carboxymethyl cellulose), SBR (styrene-butadiene rubber), PBR (polybutylacrylate), and combinations thereof.

There is a separator electrolyte 660 between the anode 620 and the cathode 640. The separator electrolyte 660 facilitates movement of lithium ions back and forth between the anode 620 and the cathode 640 as the cell 600 cycles. The separator electrolyte 660 may include any electrolyte that is suitable for use in a lithium battery cell. In some arrangements, the separator electrolyte 660 contains a liquid electrolyte that is soaked into a porous plastic material (not shown). In some arrangements, the separator electrolyte 660 contains a viscous liquid or gel electrolyte. In some arrangements, the separator electrolyte 660 contains a solid polymer or ceramic electrolyte. In some arrangements, the separator region 660 contains an electrolyte that is the same as the catholyte 646.

A solid polymer electrolyte for use in a separator region, such as the separator region 660 and/or for use as a catholyte, such as the catholyte 646, can be any electrolyte that is appropriate for use in a Li battery. Of course, many such electrolytes also include electrolyte salt(s) that help to provide ionic conductivity. Examples of such electrolytes include, but are not limited to, block copolymers that contain ionically-conductive blocks and structural blocks that make up ionically-conductive phases and structural phases, respectively. The ionically-conductive phase may contain one or more linear polymers such as polyethers, polyamines, polyimides, polyamides, poly alkyl carbonates, polynitriles, perfluoro polyethers, fluorocarbon polymers substituted with high dielectric constant groups such as nitriles, carbonates, and sulfones, and combinations thereof. In one arrangement, the ionically-conductive phase contains one or more ketone-based polymer, as disclosed herein. The linear polymers can also be used in combination as graft copolymers with polysiloxanes, polyalkoxysiloxanes, polyphosphazines, polyolefins, and/or polydienes to form the conductive phase. The structural phase can be made of polymers such as polystyrene, hydrogenated polystyrene, polymethacrylate, poly(methyl methacrylate), polyvinylpyridine, polyvinylcyclohexane, polyimide, polyamide, polypropylene, polyolefins, poly(t-butyl vinyl ether), poly(cyclohexyl methacrylate), poly(cyclohexyl vinyl ether), poly(t-butyl vinyl ether), polyethylene, poly(phenylene oxide), poly(2,6-dimethyl-1,4-phenylene oxide), poly(phenylene sulfide), poly(phenylene sulfide sulfone), poly(phenylene sulfide ketone), poly(phenylene sulfide amide), polysulfone, fluorocarbons, such as polyvinylidene fluoride, or copolymers that contain styrene, methacrylate, or vinylpyridine. It is especially useful if the structural phase is rigid and is in a glassy or crystalline state.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself

We claim:

1. A modified cathode active material, comprising:
    particles of modified lithium metal oxide cathode active material, the particles comprising $Li(Ni_{0.5-x}Co_{0.5-x}M_{2x})O_2$, where M is chosen from Al, Mg, Mn, and/or Ti and x is described by $0 \leq x \leq 0.2$, the modified particles each having a modified surface; and
    wherein the modified surface comprises an M-oxy-fluoride of $Li(Ni_{0.5-x}Co_{0.5-x}M_{2x})O_2$, the modified surface includes –F groups bonded to metal atoms in the modified particles.

2. The modified cathode active material of claim 1 wherein the particles have an average diameter between 0.1 and 50 μm.

3. A cathode comprising:
    the modified cathode active material particles of claim 1;
    a cathode electrolyte; and
    an electrolyte salt;
    wherein the modified cathode active material particles, the cathode electrolyte, and the electrolyte salt are mixed together.

4. The positive electrode of claim 3 wherein the cathode electrolyte comprises a material selected from the group consisting of alkyl carbonates, polyethers, polyamines, polyimides, polyamides, poly alkyl carbonates, polynitriles, perfluoro polyethers, fluorocarbon polymers substituted with one or more nitrile, carbonate, and/or sulfone groups, and combinations thereof.

5. The positive electrode of claim 3 wherein the electrolyte salt comprises a lithium salt.

6. An electrochemical cell, comprising:
    an anode configured to absorb and release lithium ions; a cathode according to claim 3;
    a current collector adjacent to an outside surface of the cathode; and
    a separator region between the anode and the cathode, the separator region comprising a separator electrolyte configured to facilitate movement of lithium ions back and forth between the anode and the cathode;
    wherein the separator electrolyte comprises a lithium salt.

7. The electrochemical cell of claim 6 wherein the anode comprises a material selected from the group consisting of lithium metal, lithium alloy, lithium titanate, graphite and silicon.

8. The electrochemical cell of claim 6 wherein the cathode electrolyte comprises a material selected from the group consisting of alkyl carbonates, polyethers, polyamines, polyimides, polyamides, poly alkyl carbonates, polynitriles, perfluoro polyethers, fluorocarbon polymers substituted with one or more nitrile, carbonate, and/or sulfone groups, and combinations thereof.

9. The electrochemical cell of claim 6 wherein the separator electrolyte comprises a material selected from the group consisting of alkyl carbonates, polyethers, polyamines, polyimides, polyamides, poly alkyl carbonates, polynitriles, perfluoro polyethers, fluorocarbon polymers substituted with one or more nitrile, carbonate, and/or sulfone groups, and combinations thereof.

10. The electrochemical cell of claim 6 wherein the separator electrolyte comprises a solid polymer electrolyte.

11. The electrochemical cell of claim 6 wherein the cathode electrolyte and the separator electrolyte are the same.

12. The modified cathode active material of claim 1 wherein M is Mn.

13. A modified cathode active material, comprising:
particles of modified lithium metal oxide cathode active material, the particles comprising $LiNi_{0.6}Mn_{0.2}Co_{0.2}O_2$, the modified particles each having a modified surface; and
wherein the modified surface comprises an M-oxy-fluoride of $LiNi_{0.6}Mn_{0.2}Co_{0.2}O_2$.

14. The modified cathode active material of claim 13 wherein the particles have an average diameter between 0.1 and 50 μm.

15. The modified cathode active material of claim 13 wherein the modified surface includes —F groups bonded to metal atoms in the particles.

16. A modified cathode active material, comprising:
particles of modified lithium metal oxide cathode active material, the particles comprising $Li(Ni_{1/3}M_{1/3}Co_{1/3})O_2$, the modified particles each having a modified surface; and
wherein the modified surface comprises $Li(Ni_{1/3}Mn_{1/3}Co_{1/3})O_{(2-x)}F_x$, wherein x is between 0 and 1.

17. The modified cathode active material of claim 16 wherein the particles have an average diameter between 0.1 and 50 μm.

18. The modified cathode active material of claim 16 wherein the modified surface includes —F groups bonded to metal atoms in the particles.

* * * * *